June 15, 1937.　　　J. H. SHERTS　　　2,084,113
PROCESS AND APPARATUS FOR MAKING SAFETY GLASS
Filed March 23, 1935　　　4 Sheets-Sheet 1
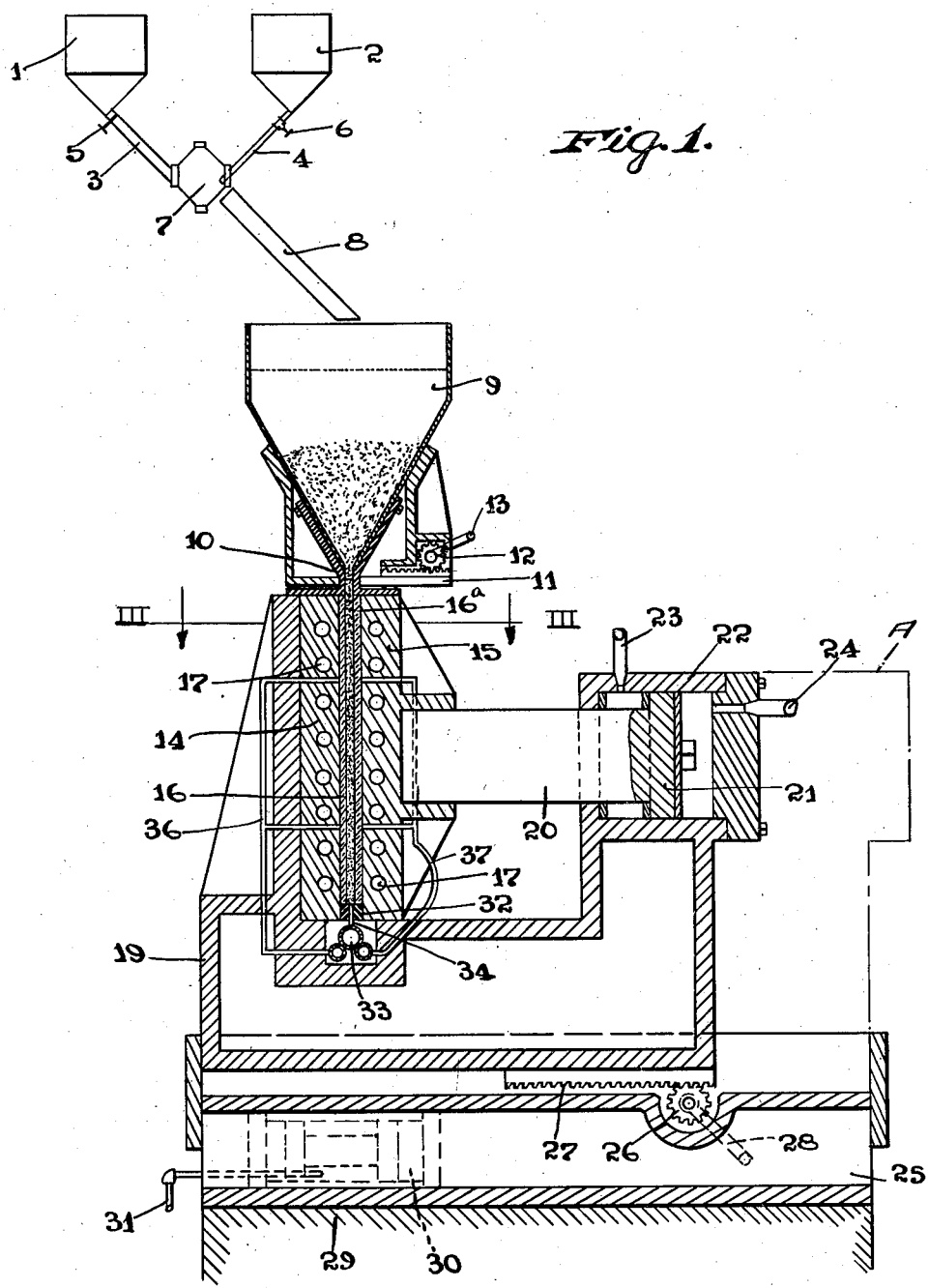
INVENTOR.
JAMES H. SHERTS
BY Bradley & Bee
ATTORNEYS.

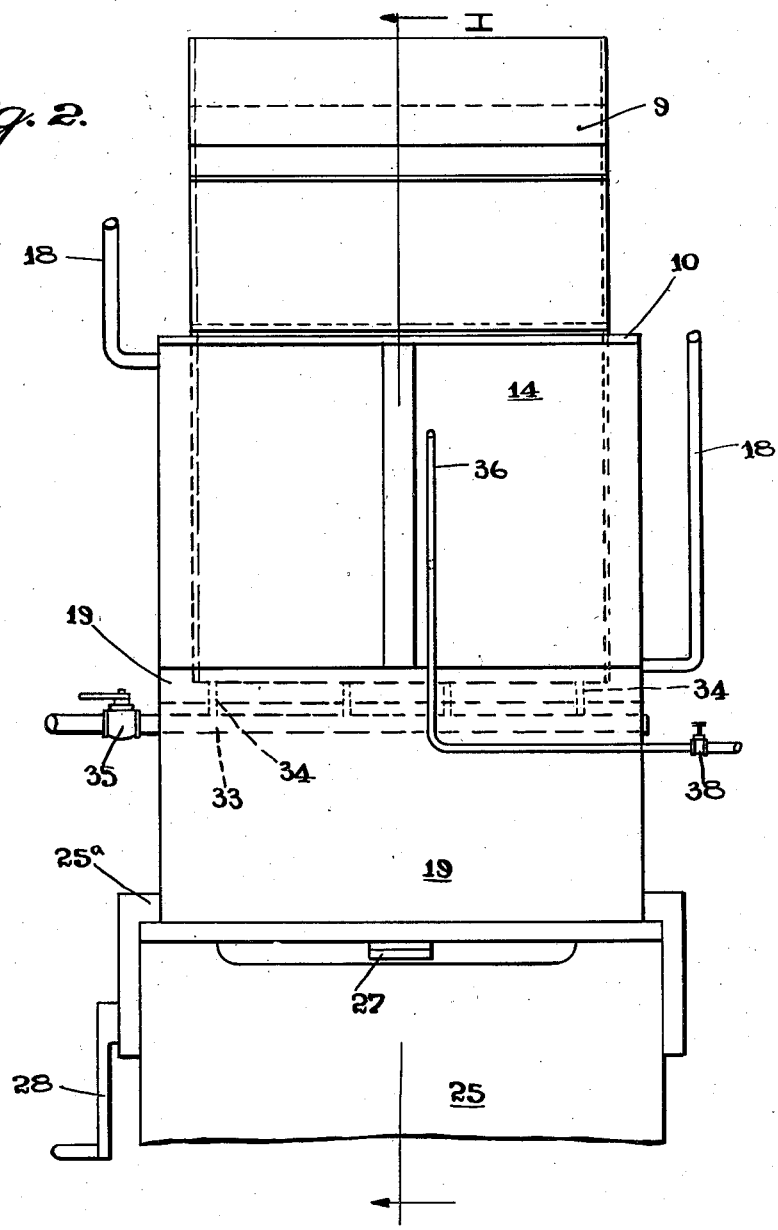

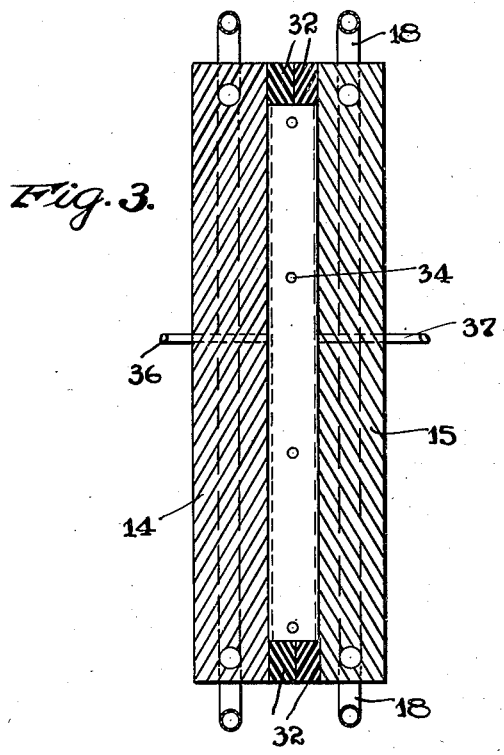
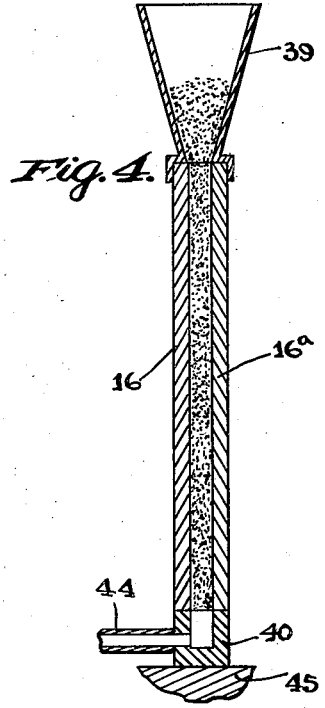
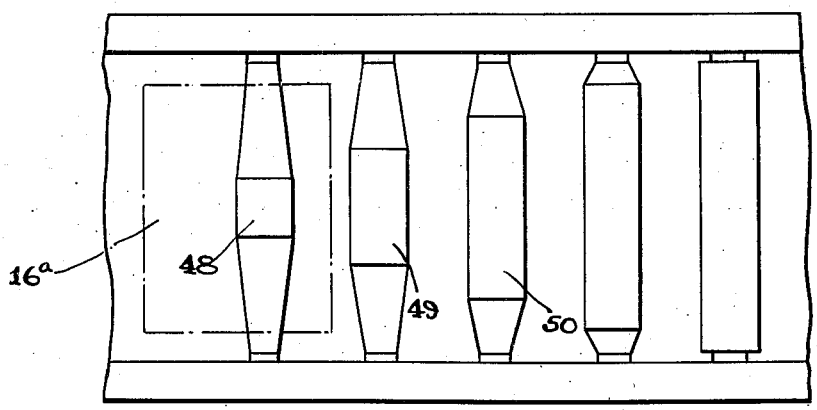

June 15, 1937. J. H. SHERTS 2,084,113
PROCESS AND APPARATUS FOR MAKING SAFETY GLASS
Filed March 23, 1935 4 Sheets-Sheet 4
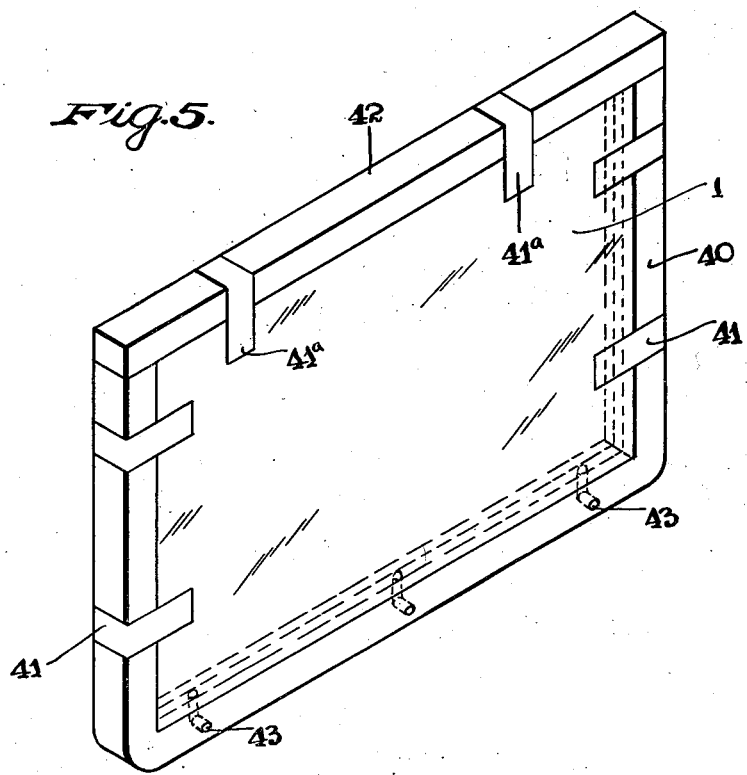
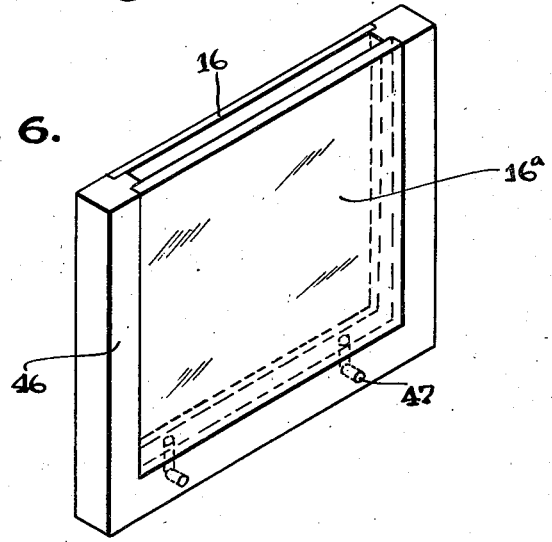
INVENTOR.
JAMES H. SHERTS
BY Bradley & Bee
ATTORNEYS.

Patented June 15, 1937

2,084,113

UNITED STATES PATENT OFFICE 2,084,113

PROCESS AND APPARATUS FOR MAKING SAFETY GLASS

James H. Sherts, Tarentum, Pa., assignor to Duplate Corporation, a corporation of Delaware Application March 23, 1935, Serial No. 12,629

8 Claims. (Cl. 49—81)

The invention relates to a process and apparatus for making safety glass which ordinarily comprises a pair of glass sheets or plates secured to the opposite sides of a sheet of reinforcing material. The present invention is directed to the making of glass of the kind specified in those cases in which the reinforcing or interlayer consists of a synthetic resin. The invention is hereinafter described in connection with a vinyl resin, such as vinyl acetal or vinyl chloracetate, but it will be understood that the invention is of broad application and may be used with many other resins, such as the glyptals, toluene sulfonamide derivatives and the like. It has for its principal objects the provision of an improved process and apparatus in which the plasticized resin in divided or powder form may be incorporated into the lamination directly without the use of solvent and without preforming into sheets, thus greatly simplifying the procedure and cheapening the product. Apparatus for carrying out the process is illustrated in the accompanying drawings, wherein:

Figure 1 is a section through the apparatus on the line I—I of Fig. 2. Fig. 2 is an end view of the apparatus. Fig. 3 is a horizontal section on the line III—III of Fig. 1. Figs. 4 and 5 are detail views illustrating a modified procedure. And Figs. 6 and 7 are detail views showing still another modification.

Referring to the drawings, 1 and 2 are containers carrying respectively the powdered resin, such as vinyl acetal, which is to be used as an interlayer, and the plasticizer for such resin, such as diethyl phthalate. The outlet pipes 3 and 4 of such containers are provided respectively with the gate 5 and valve 6. The pipes lead into a suitable mixer 7 where the two materials are mixed, after which it is conducted through a chute 8 to the hopper 9. The plasticized resin as delivered to this hopper is still in powdered form and flows freely. The lower end of the hopper is provided with an outlet neck 10, preferably of rubber and adapted to be closed by applying pressure to one side thereof. The pressure is applied by means of a gate 11 mounted for sliding movement and having a rack on its upper side. This rack is engaged by a pinion 12, whose shaft is provided with a handle 13 so that the operator may run the gate in and out to open and close the neck.

Mounted beneath the hopper 9 is a pair of platens 14 and 15 for supporting the glass sheets 16 and 16a between which the powdered resin is to be supplied. In operation, it is necessary to heat these platens and in order to accomplish this result, the platens are provided with passageways 17 leading back and forth therethrough and connected to the pipes 18 (Fig. 2) through which steam is circulated. The platen 14 is mounted in fixed position in the framework of the table 19, while the platen 15 is carried by a plunger 20 which is mounted for reciprocatory movement and carries at its end the piston 21 working in the cylinder 22, air for moving the piston being supplied and exhausted through the pipes 23 and 24. The table 19 is mounted in suitable guides 25a (Fig. 2) on the base 25 and is moved back and forth by means of a pinion 26 journalled in the base and engaging a rack 27 on the lower side of the table. The pinion is operated by means of a crank 28. The table is shown in operative position with the space between platens 14 and 15 directly beneath the hopper 9, but when it is desired to remove the completed sandwich or place new plates in position between the platens preliminary to the formation of another sandwich, the table is moved to the right to the dotted line position A, as indicated in Fig. 1. In order to promote the feed of the powdered material between the glass plates, the base 25 may be placed upon a vibrating table 29, such as is used in foundry molding machines, or such base may be provided with a vibrator 30, such as is indicated in dotted lines in Fig. 1, such vibrator being operated by means of compressed air supplied through the pipe 31 or by any other suitable means.

In order to prevent the powdered material which is fed between the glass plates 16 and 16a from escaping at the bottom and side edges of such plates, the platens are provided with the rubber strips 32, 32 (Fig. 3), such strips being located at the side and bottom edges of the platens and being cemented or otherwise secured to the platens. When the glass plates are in position between the platens with the proper space therebetween for the reception of the powdered reinforcing material, the strips 32, 32 contact at their opposing faces, as indicated in Fig. 3, and prevent any escape of the material.

In order to still further promote the flow of the powdered resin into the space between the glass plates and to remove any air from such space during the pressing operation, vacuum is applied thereto. This is accomplished by means of the suction pipe 33, connected to suitable exhausting apparatus and provided with the branch passages 34 leading up between the rubber strips 32, 32 which form the closure at the lower edges of the glass sheets. These branch pipes are provided at their upper ends with suitable screens to prevent the powdered material from working into the connections. The exhaust of air from the pipe 33 is controlled by manipulation of the valve 35, and in practice, this valve is opened while the material is being fed between the glass plates and during the pressing operation.

In order to hold the glass plates in properly spaced relation against the opposing faces of the platens, the faces of such platens are preferably grooved and connected to the sets of exhaust pipes 36 and 37, controlled by valves 38 (Fig. 2). When the glass plates are positioned against the platens, the valves 38 are opened so that suction is applied, thus holding the glass plates in proper position during the step of filling the space therebetween with resin. After the pressing operation, the vacuum holding the plates in position is released, so that on moving the platen 15 to the rear, the completed sandwich is left in released position. During the pressing operation, sufficient heat and pressure are applied to bring the interlayer to the desired thickness and colloid it into a tough, transparent sheet, any air which would otherwise be entrapped during this pressing operation being removed by means of the exhaust apparatus including the pipe 33 and branch connections 34.

If desired, the space between the glass plates 16 and 16a may be filled with the powdered resin at a point remote from the press and then placed in the press for the pressing operation, and this method of procedure is indicated in Figs. 4 and 5, wherein the glass sheets are held in spaced relation and filled from the hopper 39 having an outlet slot at its lower end through which the resin flows into the space between the sheets. During the filling operation, the sheets are supported in a soft rubber frame 40, the parts being held in assembled relation by means of strips of adhesive material 41, such as gummed paper or the like. After the filling operation is completed, a top strip 42 of soft rubber is applied, held in position by stickers 41a, and the assembly is placed in the press as shown in Fig. 1. The procedure heretofore described is then practiced in order to complete the lamination. In order to remove the air from between the glass sheets during the filling operation, the frame 40 is preferably provided with perforations 43, to which the vacuum pipes 44 are connected, and during such filling operation, the frame is preferably supported upon a vibrating table 45. When the frame is placed in the press, the ends of the holes 43 register with the ends of suitably located vacuum connections which take the place of the branch pipes 34, so that suction may be applied to the resin interlayer during the pressing operation in order to remove the air therefrom.

Figs. 6 and 7 illustrate another means of procedure in which the glass plates 16 and 16a are held in spaced relation in the filling frame 46. The space between the sheets is filled as heretofore described in connection with Figs. 4 and 5, vacuum being secured by means of the passages 47, 47 corresponding to the passages 43 shown in Fig. 5. After the space between the sheets is filled, the frame is turned to a horizontal position and the glass sheets with the resin therebetween is removed and such assemblies are passed in horizontal position between pairs of nipper rolls 48, 49, 50, etc. which apply the necessary pressure to compress the resin and colloid it, suitable heating means being provided above and below the table to soften the resin. As indicated in the drawings, the first pair of rolls 48 contact with only a limited area of the glass sheets, and each succeeding roll 49, 50, etc. engages still a larger area of the sheet, the purpose being to gradually increase the pressure from the center of the sheets outward, so as to permit a more ready escape of air in the powdered material than would be the case if nipper rolls of the ordinary type were employed engaging the glass sheets throughout their width. The term "powder" herein used as applied to the condition of the resin is intended to cover a material of varying degrees of fineness, the subdivision preferably being such that the material will pass through a 300 mesh screen.

What I claim is:

1. A process for making safety glass which consists in supporting a pair of glass sheets in an upright position in parallel and spaced apart, filling the space between the sheets with a plasticized resin in powder form, causing the powder to settle in such space completely filling it and removing the air therefrom and then subjecting the sandwich thus formed while the sheets are still in upright position to pressure and to sufficient heat to colloid the resin into a solid sheet tightly adherent to the glass sheets.

2. A process for making safety glass which consists in supporting a pair of glass sheets in an upright position in parallel and spaced apart, filling the space between the sheets with a plasticized resin in powder form, subjecting the sheets to vibration, and then applying pressure and heat to the sandwich thus formed to colloid the resin and cause it to adhere to the glass sheets.

3. Apparatus for making safety glass, comprising a pair of opposing upright heated platens having their faces in parallel adapted to support therebetween a pair of glass sheets, one of such platens being movable toward and from the other platen, means for causing the releasable attachment of the sheets to the faces of the platens with which they contact, power means for moving the movable platen, means for feeding a powdered reinforcing material into the space between the glass sheets, means for sealing the space between the glass sheets at their edges, and means for exhausting the air from such space.

4. Apparatus for making safety glass, comprising a pair of opposing upright heated platens having their faces in parallel, adapted to support therebetween a pair of glass sheets, one of such platens being movable toward and from the other platen, vacuum means for causing the releasable attachment of the sheets to the faces of the platens, power means for moving the movable platen, means for feeding a powdered reinforcing material into the space between the glass sheets, means for sealing the space between the glass sheets at their edges, and means for exhausting the air from such space.

5. Apparatus for making safety glass, comprising a pair of opposing upright heated platens having their faces in parallel adapted to support therebetween a pair of glass sheets, one of such platens being movable toward and from the other platen, compressible sealing means between the platens formed to surround the glass sheets, power means for moving the movable platen, and means for feeding a powdered reinforcing material into the space between the glass sheets.

6. Apparatus for making safety glass, comprising a pair of opposing upright heated platens having their faces in parallel adapted to support therebetween a pair of glass sheets, one of such platens being movable toward and from the other platen, means for feeding a powdered reinforcing material into the space between the glass sheets, and a compressible sealing strip carried by each platen formed to surround the glass sheet which engages its face, said strips being adapted to engage each other and prevent the escape of the powdered material during the application thereof between the glass sheets.

7. Apparatus for making safety glass, comprising a pair of opposing upright heated platens having their faces in parallel adapted to support therebetween a pair of glass sheets, one of such platens being movable toward and from the other platen, power means for moving the movable platen, means for feeding a powdered reinforcing material into the space between the glass sheets, and means for causing a vibration of the platens to promote the settling of the powdered reinforcing material in said space.

8. Apparatus for making safety glass, comprising a pair of opposing upright heated platens having their faces in parallel adapted to support therebetween a pair of glass sheets, one of such platens being movable toward and from the other platen, power means for moving the movable platen, means for feeding a powdered reinforcing material into the space between the glass sheets, means for sealing the space between the glass sheets at their edges, and means for exhausting the air from such space.

JAMES H. SHERTS.